United States Patent
Tanaka et al.

[11] Patent Number: 6,070,201
[45] Date of Patent: May 30, 2000

[54] ALTERNATE SELECTION OF VIRTUAL DATA BUFFER PATHWAYS

[75] Inventors: Yutaka Tanaka, Osakashi; Keiji Okamoto, Hirakatashi; Hideo Ishida, Katanosi, all of Japan

[73] Assignee: Matsushita Electric Industrial Co., Ltd., Japan

[21] Appl. No.: 08/937,798

[22] Filed: Sep. 25, 1997

[30] Foreign Application Priority Data

Sep. 26, 1996 [JP] Japan ................................. 8-254981

[51] Int. Cl.⁷ ................................................. G06F 13/368
[52] U.S. Cl. ................................ 710/52; 710/53; 710/111
[58] Field of Search ........................... 365/233; 704/500; 395/115; 710/53, 52, 56, 58, 117, 124, 111

[56] References Cited

U.S. PATENT DOCUMENTS

| | | | |
|---|---|---|---|
| 5,838,888 | 11/1998 | Oda | 358/1.16 |
| 5,860,060 | 1/1999 | Li et al. | 704/500 |
| 5,901,110 | 5/1999 | Jang | 365/233 |

FOREIGN PATENT DOCUMENTS 5-35407  2/1993  Japan .

*Primary Examiner*—B. James Peikari
*Attorney, Agent, or Firm*—Parkhurst & Wendel, L.L.P.

[57] ABSTRACT

A memory control device having a plurality of data transfer paths including a storage device group comprising a plurality of storage devices for storing data and a buffer memory group comprising multiple buffer memories for storing transferred data, dividing files into multiple blocks for storing blocks in multiple storage devices on different data transfer paths, and executing control to read data from the storage device to be output with a request from a connected terminal to the buffer memory wherein storage devices on different paths create multiple virtual storage device groups, and buffer memories create virtual buffer memory groups. The memory control device comprises a data output control for executing control in a first cycle, the data being temporarily dividedly stored in a prescribed virtual storage device group. In a second cycle the device outputs data stored in the virtual buffer memory group and by alternately repeating first and second cycles, data read from the plural virtual buffer memories group is switched.

58 Claims, 9 Drawing Sheets

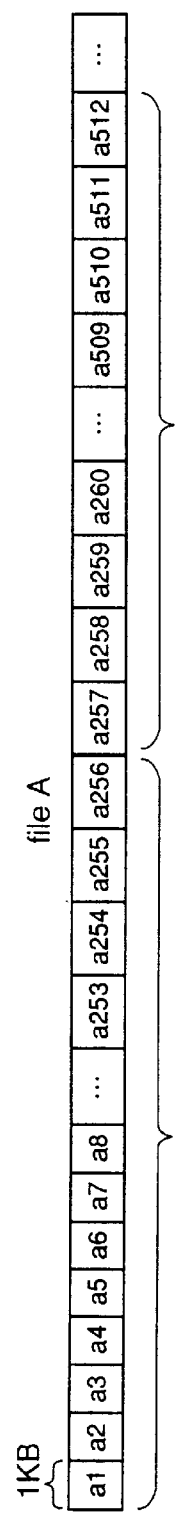
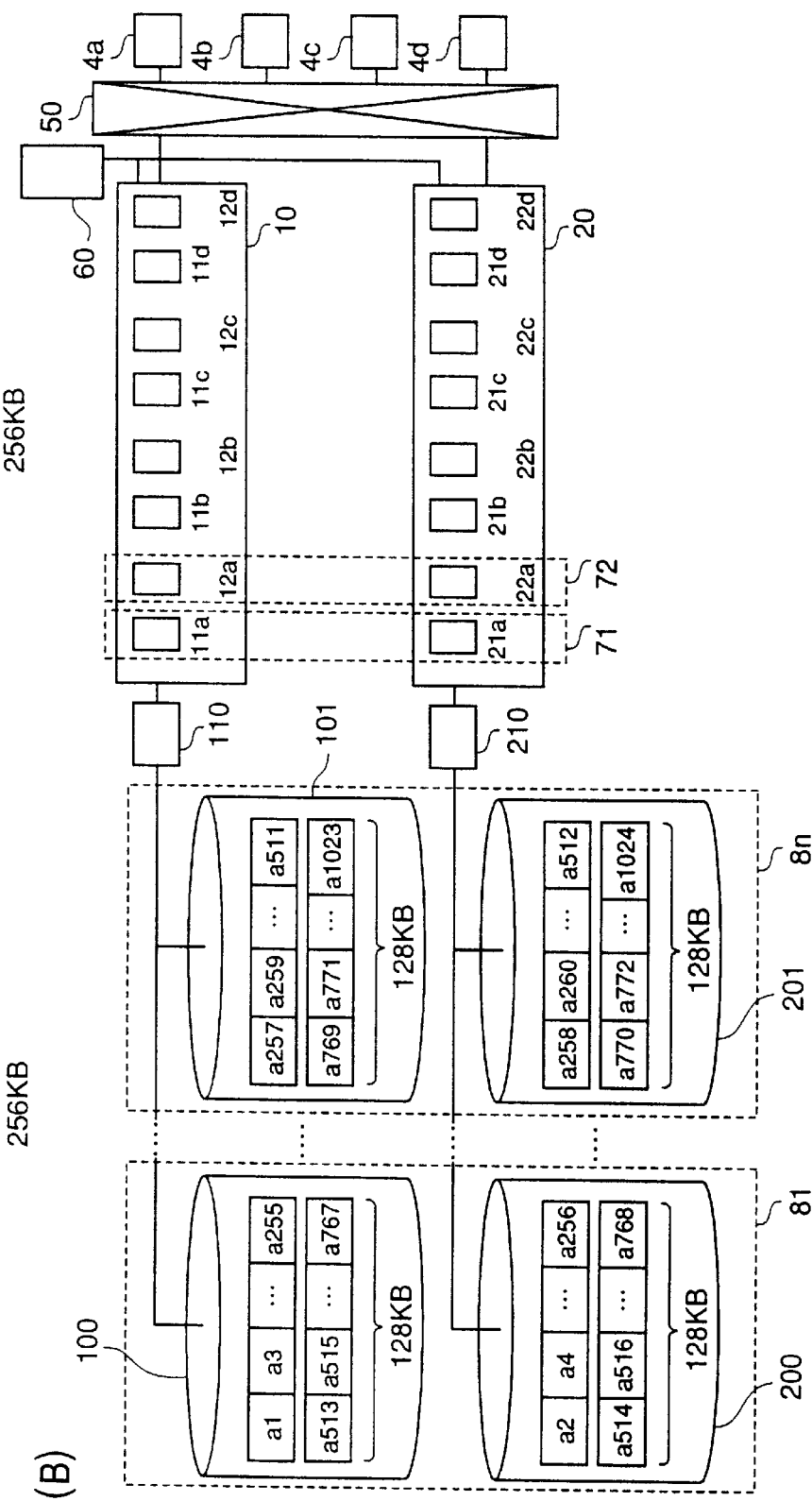
Fig.2 (A)
Fig.2 (B)

ALTERNATE SELECTION OF VIRTUAL DATA BUFFER PATHWAYS

FIELD OF THE INVENTION

The present invention relates to a memory control device and, more particularly to efficiency in data transfer of a buffer memory control device with plural buffer memories.

BACKGROUND OF THE INVENTION

FIG. 5 is a block diagram illustrating a structure of a prior art buffer memory control device. In FIG. 5, buffer memories 11a to 11d and 12a to 12d are included in a data output device 10. Buffer memories 21a to 21d and 22a to 22d are included in a data output device 20. A storage device 100 is connected to the data output device 10. A storage device 200 is connected to the data output device 20. An interface circuit 110 is used for controlling the storage device 100. An interface circuit 210 is used for controlling the storage device 200. Data receiving devices (client terminals) 4a to 4d are used for issuing transfer request of data. A switching device 50 (hub) is used for connecting outputs from the data output devices 10 and 20 to the data receiving devices 4a to 4d.

Data of files A, B, C, and D (not shown) is respectively divided into block data A1, A2, ..., B1, B2, ..., C1, C2 ... D1, D2, ... of 256 KB, which are stored in the storage devices 100 and 200. As an example of this, a structure of the file A is shown in FIG. 6. In FIG. 6, reference numerals 1, 2 and 3 designate a file A which is divided into a small block of 1 KB, a block A1 of 256 KB consisting of small blocks 1 to 256 of the file A, and a block A2 of 256 KB consisting of small blocks 257 to 512 subsequent to the block A1, respectively. In this way, the file A is divided into plural blocks of 256 KB. As shown in FIG. 5, blocks A1, A3, ..., of odd numbers, and blocks A2, A4, ..., of even numbers are stored in storage devices 100 and 200, respectively. Similarly, the file B is divided into data B1 to B6 and stored in the storage devices 100 and 200, the file C is divided into data C1 to C6 and stored in the storage devices 100 and 200, and the file D is divided into data D1 to D6 and stored in the storage devices 100 and 200, although these are not shown in Figures.

A method of simultaneously transmitting data of the file A to the data receiving device 4a, data of the file B to the data receiving device 4b, data of the file C to the data receiving device 4c, and data of the file D to the data receiving device 4d is disclosed in Japanese Patent Application No. 5-35407 and will be described with reference to FIG. 7. FIG. 7 is a diagram illustrating a relation between data readout from a storage device and data output to the data receiving device every cycle in the prior art buffer memory control device.

In a first cycle, the data output device 10 reads the block data A1 from the storage device 100 and temporarily stores the block data A1 in the buffer memory 11a. Then, the data output device 10 reads the block data B1 from the storage device 100 and temporarily stores the block data B1 in the buffer memory 11b. The data output device 20 reads the block data C2 from the storage device 200 and temporarily stores the block data C2 in the buffer memory 21c. Then, the data output device 20 reads the block data D2 from the storage device 200 and temporarily stores the block data D2 in the buffer memory 21d.

In a second cycle, the data output device 10 reads the block data C3 from the storage device 100 and temporarily stores the block data C3 in the buffer memory 11C. Then, the data output device 10 reads the block data D3 from the storage device 100 and temporarily stores the block data D3 in the buffer memory 11d. The data output device 20 reads the block data A2 from the storage device 200 and temporarily stores the block data A2 in the buffer memory 21a. Then, the data output device 20 reads the block data B2 from the data storage device 200 and temporarily stores the block data B2 in the buffer memory 21b. In addition, the data output device 10 outputs the block data A1 temporarily stored in the buffer memory 11a to the data receiving device 4a and simultaneously outputs the block data B1 temporarily stored in the buffer memory 11b to the data receiving device 4b via the switching device 50. The data output device 20 outputs the block data C2 temporarily stored in the buffer memory 21c to the data receiving device 4c and simultaneously outputs the block data D2 temporarily stored in the buffer memory 21d to the data receiving device 4d via the switching device 50.

In a third cycle, the data output device 10 reads the block data A3 from the storage device 100 and temporarily stores the block data A3 in the buffer memory 12a. Then, the data output device 10 reads the block data B3 from the storage device 100 and temporarily stores the block data B3 in the buffer memory 12b. The data output device 20 reads the block data C4 from the storage device 200 and temporarily stores the block data C4 in the buffer memory 22c. Then, the data output device 20 reads the block data D4 from the storage device 200 and temporarily stores the block data D4 in the buffer memory 22d. In addition, the data output device 10 outputs the block data C3 temporarily stored in the buffer memory 11c to the data receiving device 4c and simultaneously outputs the block data D3 temporarily stored in the buffer memory lid to the data receiving device 4d via the switching device 50. The data output device 20 outputs the block data A2 temporarily stored in the buffer memory 21a to the data receiving device 4a and simultaneously outputs the block data 12 temporarily stored in the buffer memory 21b to the data receiving device 4b via the switching device 50.

It should be noted that starting of data transfer from the data output device 10 in the third cycle is delayed if data transfer from the data output device 10 to the data receiving device 4a or to the data receiving device 4b is not completed in the second cycle. In some files, a data transfer rate requested by the data receiving device is low, and it is not possible to specify when switching from the data output device 10 to the data output device 20 is performed. Switching between these output devices is identical to those of the files B, C and D. When data is smoothly transferred, a video-file-1 and a video-file-2 are switched every given time and sequentially read from the data output devices 10 and 20 at maximum transfer efficiency 1.5 Mbps as shown in FIG. 8. When readout of the video file 1 is not completed by the time readout of the subsequent video file 2 is started, readout period of the video file 1 is overlapped with readout period of the video file 2 as shown FIG. 9, data with a maximum efficiency that is higher than 1.5 Mbps cannot be read properly and such data is deserted or a screen is temporarily stopped until readout of the video file 1 is completed and display is resumed after readout of the video file 1 is completed.

In a fourth cycle, the data output device 10 reads the block data C5 from the storage device 100 and temporarily stores the block data C5 in the buffer memory 12c. Then, the data output device 10 reads the block D5 from the storage device 100 and temporarily stores the block data D5 in the buffer memory 12d. The data output device 20 reads the block data A4 from the storage device 200 and temporarily stores the block data A4 in the buffer memory 22a. Then, the data output device 20 reads the block data B4 from the data storage device 200 and temporarily stores the block data B4 in the buffer memory 22b. In addition, the data output device 10 outputs the block data A3 temporarily stored in the buffer memory 12a to the data receiving device 4a and simultaneously outputs the block data B3 temporarily stored in the buffer memory 12b to the data receiving device 4b via the switching device 50. The data output device 20 outputs the block data C4 temporarily stored in the buffer memory 22c to the data receiving device 4c and simultaneously outputs the block data D4 temporarily stored in the buffer memory 22d to the data receiving device 4d via the switching device 50.

In subsequent cycles, as in the first to fourth cycles, the data output devices 10 and 20 each reads a block to be read and temporarily stores the block in an allocated buffer memory, and then in the following cycle, they output the blocks to the data receiving devices 4a to 4d, respectively. This processing is repeated till the last file. In this way, alternate switching is performed between buffer memories for readout from the storage devices 100 and 200 and buffer memories for data output to the data receiving devices, thereby it is possible to sequentially output data of files with various transfer rates. In order to output data to 4 data receiving devices, the data output devices 10 and 20 each requires buffer memories of 256 KB×8, resulting in a total memory capacity of 4 KB in the entire system.

In the prior art memory control device constructed above, buffer memories for readout and buffer memories for data output to the data receiving device are alternately switched, thereby it is possible to continuously output data of files with various transfer rates. However, there has been a problem that use of this construction causes a large total capacity of buffer memories and high cost in the entire system. If a size of a buffer memory is reduced to lower cost, amount of data that can be read from the storage devices 100 and 200 in one readout is reduced, resulting in a shorter time for use in data readout and higher frequency of access to data for reading data of the same capacity. In is the storage devices 100 and 200, there is a seek time as a moving time of head for reading data from a disk or a loss time such as a waiting time before an area of storage rotates to a vicinity of a head as in the general-use hard disk drive (HDD). For this reason, if a size of a buffer memory is reduced and frequency of access is increased, most of the time in a cycle is occupied with the seek time or loss time. Consequently, amount of data that can be read from the data storage devices 100 and 200 in a given time is reduced and accordingly amount of data that is output from the data output devices 10 and 20 every cycle is reduced, resulting in fewer data receiving devices that can output data.

SUMMARY OF THE INVENTION

It is an object of the present invention to provide a memory control device in which required total capacity of buffer memories is reduced without reducing a number of data receiving devices which can output data.

According to the invention, a memory control device which has plural data transfer paths including a storage device group consisting of plural storage devices for storing data and a buffer memory group consisting of plural buffer memories for storing data that is transferred from the storage device group, divides a file into plural blocks of a given size to store the blocks in plural separate storage devices on different data transfer paths, and executes control so as to read data from the storage device to be output in accordance with a request of a terminal connected to the buffer memory wherein, storage devices on the different data transfer paths are selected to create plural virtual storage device groups, and buffer memories on the different data transfer paths are selected to create plural virtual buffer memory groups, said memory control device comprising a data output control means which executes control so that in a first cycle, the data stored dividedly in a prescribed virtual storage device group of the plural virtual storage device groups is stored to be temporarily stored in a prescribed virtual buffer memory group of the plural virtual buffer memory groups, and data stored in a virtual buffer memory group except the prescribed virtual buffer memory group, in a second cycle, data stored dividedly in a virtual buffer memory group except the prescribed virtual buffer memory group to be temporarily stored in a virtual buffer memory group except the prescribed virtual buffer memory group and outputs data stored in the prescribed virtual buffer memory group, and by alternately repeating the first and second cycles, data read from the plural virtual buffer memory groups is switched.

Therefore, total capacity of the buffer memories of data output devices can be reduced.

In addition, when the number of virtual storage device groups is not smaller than 3 or the virtual buffer memory groups are managed as free buffer memories, total capacity of buffer memories can be reduced.

Further, the device can cope with a variation of data transmission rate to data receiving devices by setting the number of virtual buffer memory groups to be 3 or larger.

Further, a network interface circuit is connected to buffer memories, thereby it is possible to transmit data to data receiving devices all over the world with ease.

Furthermore, a bus interface circuit is connected to buffer memories, thereby video of high quality are transmitted at a higher-speed.

Furthermore, connection between the data output control means and the data transfer path is established by a network, thereby it is possible to place them spaced apart from each other, for example, in different buildings.

Furthermore, connection between the data output control means and the data transfer path is established by a bus, thereby it is possible to transmit more control instructions from the data output control means to the data transfer path in a prescribed time and the number of data receiving devices is increased.

Furthermore, connection between the data output control menas and the data transfer path is established by a serial, thereby the data output control means and the data transfer path is placed spaced apart by about 10 meters and usage of the data output control means and the data transfer path can be reduced.

Furthermore, synchronous control of plural data transfer paths is performed in a specified error range, thereby it is possible to continuously reproduce data with no discontinuity in the data receiving device.

Furthermore, control instructions to the data output device are integrated to be transmitted to the data transfer path, thereby load on the data output control means can be reduced.

Furthermore, control instructions are transmitted from the data output control means to the data transfer path by DMA, thereby load on operation of the data output control means can be reduced.

Thus, in accordance with the memory control device according to the present invention, total capacity of buffer memories can be reduced without reducing the number of the data receiving devices and system design or control method can be changed as required.

Other objects and advantages of the invention will become apparent from the detailed description that follows. The detailed description and specific embodiments described are provided only for illustration since various additions and modifications within the scope of the invention will be apparent to those of skill in the art from the detailed description.

BRIEF DESCRIPTION OF THE DRAWINGS

FIGS. 2(a) and 2(b) are block diagrams illustrating a memory control device according to an embodiment 2 of the present invention.

DETAILED DESCRIPTION OF THE PREFERRED EMBODIMENTS

Embodiment 1

A memory control device according to a first embodiment of the present invention will now be described with reference to figures.

Figure 1:
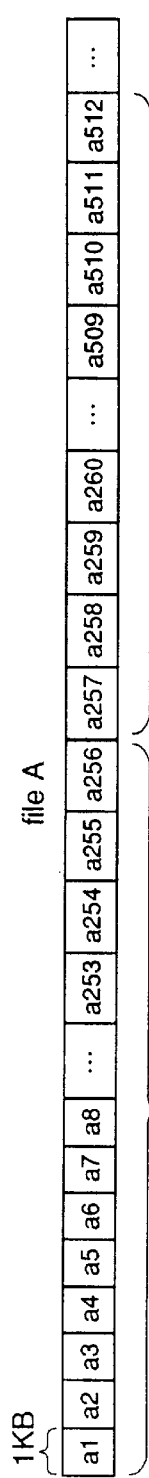
FIG. 1(A) is a diagram illustrating a structure of a file A in a memory control device according to the embodiment 1 of the present invention.
FIG. 1(B) is a block diagram illustrating a structure of a memory control device according to embodiments 4, 10 and 11 of the present invention.
Figure 1:
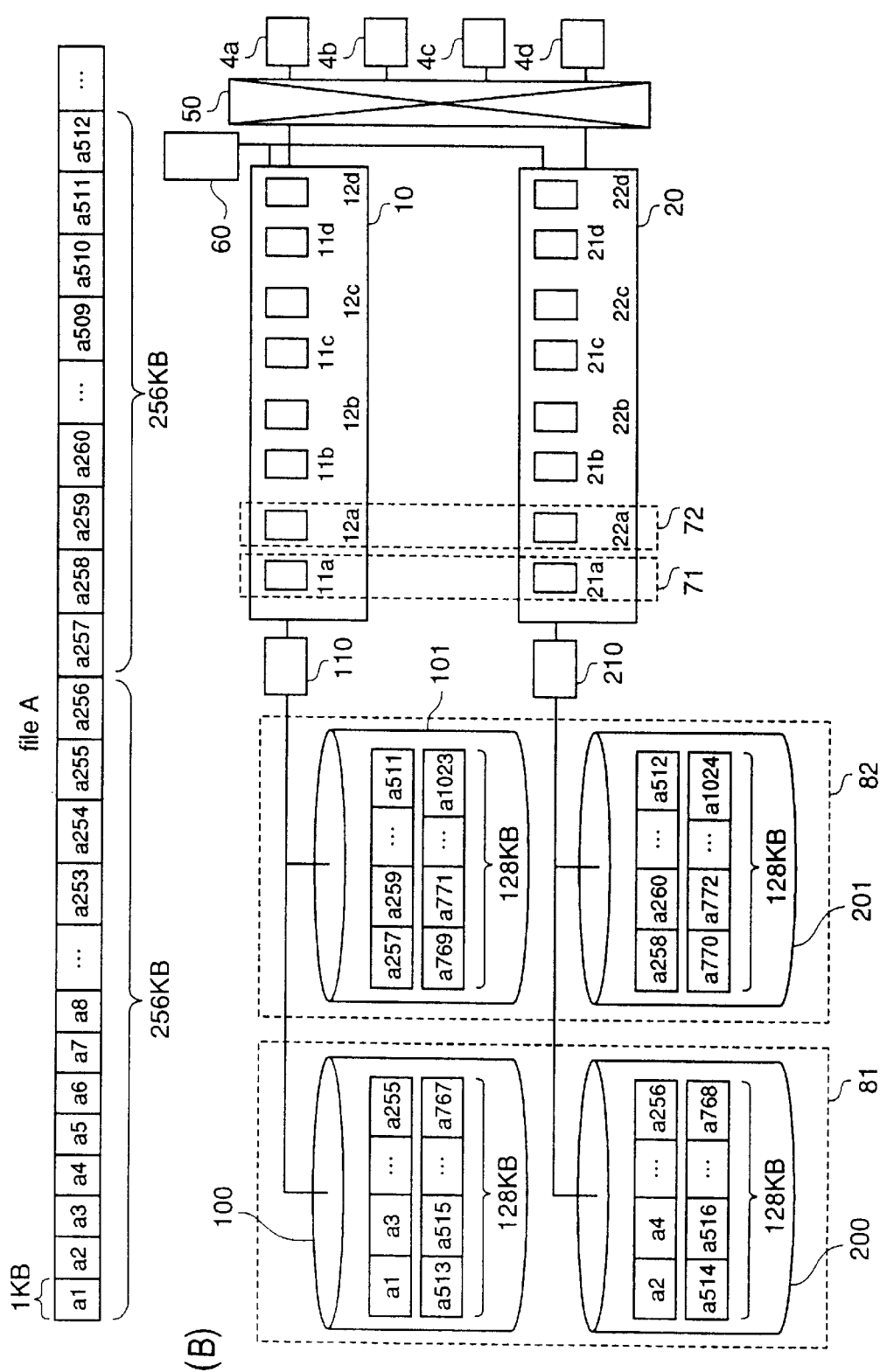
Figure 3:
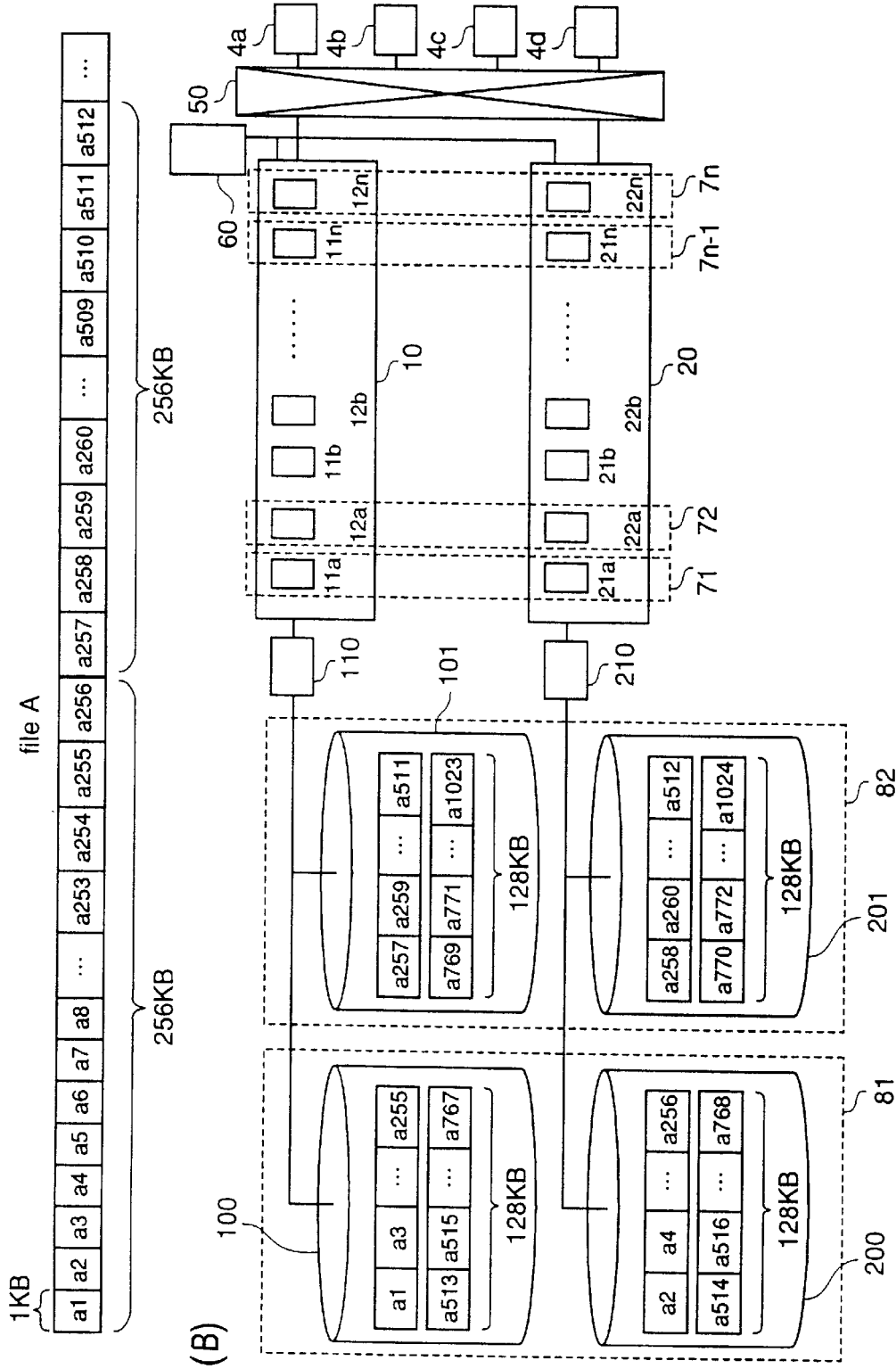
FIGS. 3(a) and 3(b) are block diagrams illustrating a structure of a memory control device according to an embodiment 3 of the present invention.

FIG. 1(A) illustrates a structure of a file A. As shown in FIG. 1(A), the file A is divided into blocks of 1 KB size a1, a2, a3, . . . FIG. 1(B) is a block diagram illustrating a structure of the memory control device according to the embodiment 1. In FIG. 1, buffer memories 11a to 11d and 12a to 12d are included in a data output device 10. Buffer memories 21a to 21d and 22a to 22d are included in a data output device 20. Storage devices 100 and 101 are connected to the data output device 10. Storage devices 200 and 201 are connected to the data output device 20. An interface circuit 110 is used for controlling the storage devices 100 and 201. Data receiving devices 4a to 4d are used for issuing transfer requests of data. A switching device 50 is used for connecting data which is output from the data output devices 10 and 20 to the data receiving devices 4a to 4d. A data output device control circuit 60 is used for controlling the data output devices 10 and 20. A virtual buffer memory group 71 includes buffer memories 11a and 21a. A virtual buffer memory group 72 includes buffer memories 12a and 22a. A virtual storage device group 81 includes storage devices 100 and 200. A virtual storage device group 82 includes storage devices 101 and 201.

In this embodiment, when the file A shown in FIG. 1(A) is stored in the storage devices 100, 101, 200, and 201, blocks a1 to a 256 of 256 KB size are stored in the storage devices 100 and 200 constituting the virtual storage device group 81. In this case, 128 blocks a1, a3, . . . a255 of odd numbers are stored in the storage device 100 in a block of 128 KB size and 128 blocks a2, a4, . . . a256 of even numbers are stored in the storage device 200 in a block of 128 KB size.

Subsequent blocks a257 to a512 of 256 KB size constituting the file A are stored in the storage devices 101 and 201 constituting the virtual storage device group 82. Also In this case, 128 blocks a257, a259, . . . a511 of odd numbers are stored in the storage device 101 in a block of 128 KB size and 128 blocks a258, a260, . . . a512 of even numbers are stored in the storage device 201 in a block of 128 KB size.

Blocks subsequent to a block a513 are alternately stored in the virtual storage device groups 81 and 82 in a block of 256 KB size. An operation of transmitting data of the file A thus stored in the storage devices 100, 101, 200, and 201 to a data receiving device 4a is described hereinafter.

In a first cycle, the data output devices 10 and 20 read the blocks al to a256 of 256 KB size of the file A from the virtual storage device group 81 and store the same in the virtual buffer memory group 71, in accordance with control of the data output device control circuit 60. That is, the interface circuit 110 reads the blocks a1, a3, . . . , a255 from the storage device 100 and temporarily stores the same in the buffer memory Ila, and the interface circuit 210 reads the blocks a2, a4, . . . , a256 from the storage device 200 and temporarily stores the same in the buffer memory 21a.

In a second cycle, the data output devices 10 and 20 output the blocks a1 to a256 stored in the virtual buffer memory group 71 in accordance with control of the data output control device circuit 60. That is, the data output device 10 outputs the block a1 stored in the buffer memory 11a, the data output device 20 outputs the block a2 stored in the buffer memory 21a, the data output device 10 outputs the block 3a stored in the buffer memory 11a, and the data output device 20 outputs the block a4 stored in the buffer memory 21a. Thereafter, similarly, the data output devices 10 and 20 alternately output the blocks a5, . . . , a256 stored in the buffer memories 11a and 21a in the ascending order of block number. Block data a1 to a 256 output from the virtual buffer memory group 71 is transmitted to the data receiving device 4a through the switching device 50.

Simultaneously in the second cycle, the output devices 10 and 20 read the block data d257 to a512 of 256 KB size constituting the file A from the virtual storage device group 82 in accordance with control of the data output device control circuit 60 and temporarily store the same in the virtual buffer memory group 72. That is, the interface circuit 110 reads the blocks a257, a259, . . . , a511 from the storage device 101 and temporarily stores the same in the buffer memory 12a, and the interface circuit 210 reads the blocks a258, a260, . . . , a512 from the storage device 201 and temporarily stores the same in the buffer memory 22a.

In a third cycle, the data output devices 10 and 20 output the blocks a257 to a512 stored in the virtual buffer memory group 72 in accordance with control of the data output device control circuit 60. Block data a257 to a512 output from the virtual buffer memory group 72 is transmitted to the data receiving device 4a through the switching device 50.

Simultaneously in the third cycle, the data output devices 10 and 20 read the blocks a513 to a768 of 256 KB size constituting the file A and temporarily store the same in the virtual buffer memory group 71 in accordance with control of the data output device control circuit 60.

In a fourth cycle, the data output devices 10 and 20 output blocks a513 to a768 (not shown) stored in the virtual buffer memory group 71 in accordance with control of the data output device control circuit 60. Block data a513 to a768 output from the virtual buffer memory group 71 is transmitted to the data receiving device 4a through the switching device 50.

Simultaneously in the fourth cycle, the data output devices 10 and 20 read the blocks a769 to a1024 (not shown) of 256 KB size constituting the file A and temporarily store the same in the virtual buffer memory group 72 in accordance with control of the data output device control circuit 60.

Similarly in subsequent cycles including a fifth cycle, readout of data is switched between the virtual storage device groups 81 and 82 every cycle, and simultaneously storage or output of data is sequentially switched between the virtual buffer memory groups 71 and 72.

Thus, in the memory control device according to the embodiment 1, in the N-th cycle, data that is read from the virtual storage device group 81 is temporarily stored in the virtual buffer memory group 71, and simultaneously data that has been stored in the virtual buffer memory group 72 in the (N−1)-th cycle is output to the data receiving device 4a, and in the (N+1)-th cycle, data that has bee stored in the virtual buffer memory group 71 in the N-th cycle is output to the data receiving device 4a and data that has been read from the virtual storage device group 82 is stored in the virtual buffer memory group 72. In this way, switching of the virtual storage devices 81 and 82 from which data is read and the virtual buffer memory groups 71 and 72 in/from which data is stored/output are respectively performed every cycle. Therefore, the data output devices 10 and 20 each requires 120 KB×8 buffer memories, for transmitting arbitrary file data to the data receiving devices 4a to 4d, respectively, so that the total capacity of memories is 2 MB in the entire system. As a result, total capacity of required buffer memories can be reduced.

Furthermore, suppose that the maximum transfer efficiency is 75 Mbps and a number of clients is 100 in the construction described above, when 50 client terminals issue readout requests of video streams at 1.5 Mbps (cycle time 1.33) and another 50 client terminals issue readout requests of video streams at 1.3 Mbps (cycle time 1.54) at the time t=0, total bit rates G1 and G2 are respectively expressed as In the first cycle (0≦t<1.33)
G1(t)=1.5×50=75 (Mbps)
G2(t)=1.3×50=65 (Mbps)
In the second cycle (1.33≦t<1.54)
G1(t)=0 (Mbps)
G2(t)=(1.3+1.5)×50=140 (Mbps)
In the third cycle (1.54≦t<2.66)
G1(t)=1.3×50=65 (Mbps)
G2(t)=1.5×50=75 (Mbps)
In the fourth cycle (2.66≦t<3.08)
G1(t)=(1.3+1.5)×50=140 (Mbps)
G2(t)=0 (Mbps).

As can be seen from the above equations, in the second and fourth cycles, requested total bit rates exceed the maximum transfer efficiency and continuous transfer cannot be performed. However, in this embodiment, the virtual storage device groups and the virtual buffer memory groups are used for transfer.

As a result, in each cycle,
G1(t)=(1.5/2+1.3/2)×50=70 (Mbps)
G2(t)=(1.5/2+1.3/2)×50=70 (Mbps).
Thus, the total bit rates G1 and G2 are always constant and lower than the maximum transfer efficiency (75 Mbps). Therefore, transfer processing is not difficult and no discontinuity and lack of video occurs.

Embodiment 2

A memory control device according to an embodiment 2 of the present invention is described. The memory control device according to the embodiment 2 includes 3 or more virtual storage device groups and switching of the virtual storage device groups 81, 82, . . . 8n from which data is read is performed sequentially every cycle.

For example, in case of using 3.5 inch hard disk drive (HDD) as storage devices 100, 101, 200, and 201, though a storage capacity of HDD has been increased for the last few years, the HDD has only 9 GB capacity at maximum. The system including 4 storage devices 100, 101, 200 and 201 as shown in the embodiment 1 has only 36 GB total storage capacity when HDD of 9 GB capacity is used. A case in which a two-hour movie is stored in the system of 36 GB storage capacity is described, for example. About 1.3 GB storage capacity is necessary to compress the two-hour movie according to a motion picture compression format MPEG 1. About 5.2 GB storage capacity is necessary to compress the two-hour movie according to motion picture compression format MPEG 2 for high quality image such as S-VHS, so that the system of 36 GB storage capacity can store only 27 pieces of movies according to the MPEG 1 and only 6 pieces of movies according to the MPEG 2. Therefore, it is necessary to increase total storage capacity of the entire system. However, when a number of the virtual storage device groups is limited to 2 as in the embodiment 1, the storage devices 100, 101, 200, and 201 each has a limited capacity, so that it is not easy to increase total storage capacity of the entire system.

Suppose that a number of storage devices 100, 101, 200, and 201 in the virtual storage device groups 81 and 82 is increased. Increase of the number of the storage devices creates a RAID (Redundant Arrays of Independent Disks) in the virtual storage devices 81 and 82, respectively. The RAID is one method of a storage device in which data of a size is divided and written/read in parallel onto/from plural HDDs rather than the data is written/read onto/from one HDD, thereby processing time is reduced compared with a case in which one HDD is used. According to this method, there are plural virtual storage device groups 81 and 82 constituting one RAID and the entire storage device groups 81 and 82 are handled as the RAID. As a result, control of plural RAIDs is extremely complicated and does not provide practicality.

In accordance with the embodiment 2, the number of the virtual storage device groups 81 and 82 is set to be 3 or larger as shown in FIG. 2 and data is read by sequentially performing switching of plural virtual storage device groups 81, 82, . . . 8n every cycle. As a result, total storage capacity of the entire system can be increased with ease.

Embodiment 3

A memory control device according to an embodiment 3 of the present invention is described. The memory control device according to the embodiment 3 comprises three or more virtual buffer memory groups and switching is sequentially performed every cycle between the virtual buffer memory group 7n−1(7n) from which data is output and the virtual buffer memory group 7n(7n−1) in which data is temporarily stored.

When the number of the virtual buffer memory groups is limited to 2 as in the embodiment 1, the device lacks flexibility to cope with a variation of a rate at which data is transmitted to the data receiving devices 4a to 4d.

When the data transmission rate at which data is output from the virtual buffer memory groups 71 and 72 is lower than an upper limit (1.5 Mbps in MPEG1 and 6 Mbps in MPEG2) in an average data transmission rate of various motion picture compression format, since there is some data left in the virtual buffer memory group 71(72) at the end of the N-th cycle, subsequent data to be stored in the virtual buffer memory group 71(72) cannot be read. It follows that subsequent data will be read at a timing after the (N+1) cycle. If the data left in the virtual buffer memory group 71(72) and the data stored in the virtual buffer memory group 72(71) are not output continuously by the completion of (N+2)-th cycle, discontinuity of video occurs. In addition, when the transmission rate at which the data is output from the virtual buffer memory group is higher than the upper limit of the average data transmission rate in various motion picture compression format, output of data from the virtual buffer memory groups 71 and 72 is completed before the completion the N-th cycle, also causing discontinuity of video.

To solve the problem, the number of the virtual buffer memory groups is set to be 3 or larger and data is stored/output by sequentially performing switching of plural virtual buffer memory groups 71, 72, . . . 7n every cycle. As a result, the device can obtain flexibility to cope with a variation of the rate at which data is transmitted to the data receiving devices.

Embodiment 4

A memory control device according to an embodiment 4 of the present invention is described. The memory control device according to the embodiment 4 manages buffer memories 11a to 12d and 21a to 22d as free buffer memories in the construction of the embodiment 1, selects required buffer memories from these free buffer memories 11a to 12d and 21a to 22d and manages the same as the virtual buffer memory group 71(72), to temporarily store data, and selects buffer memories 11a and 21a (12a and 22a) from the virtual buffer memory group 71(72) and manages the same again as the free buffer memories even in the middle of the N-th cycle at the completion of output of data. The buffer memories are managed by the data output device control circuit 60.

For example, an operation of transmitting data of the file A to the receiving device 4a is described.

In a first cycle, the data output device control circuit 60 selects the buffer memories 11a and 21a from the free buffer memories 11a to 12d and 21a to 22d to create the virtual buffer memory group 71. Then, the data output devices 10 and 20 read data a1, . . . , a255 from the virtual storage device group 81 and temporarily store the same in the buffer 11a and read data a2, . . . , a256 from the virtual storage device group 81 and temporarily store the same in the buffer 21a, respectively, in accordance with control of the data output device control circuit 60. The data output device control circuit 60 includes buffer memory management tables corresponding to the data output devices 10 and 20, respectively. The data output device control circuit 60 manages the buffer memories according to the management tables.

In a second cycle, the data output devices 10 and 20 output data temporarily stored in the virtual buffer memory group 71 (buffer memories 11a and 21a) to the data receiving device 4a in accordance with control of the data output device control circuit 60. At the completion of output of data from the virtual buffer memory group 71, the data output device control circuit 60 releases free buffer memories 11a and 21a from the virtual buffer memory group 71 and manages the same again as the free buffer memories 11a and 21a.

Simultaneously in the second cycle, the data output device control circuit 60 selects buffer memories 12a and 22a from free buffer memories 11a to 12d and 21a to 22d to create the virtual buffer memory group 72. Then the data output devices 10 and 20 read data a257, . . . , a511 from the virtual storage device group 82 and temporarily store the same in the buffer 12a and read data a258, . . . a512 from the virtual storage device group 82 and temporarily store the same in the buffer 22a, respectively, in accordance with control of the data output device control circuit 60.

Similarly in subsequent cycles including a third cycle as in the first and second cycles, buffer memories required for storage are selected from free buffer memories and managed as the virtual buffer memory group 71 (72) for data that is read from the virtual storage device group 81 (82) and, on completion of output of data stored in the virtual buffer memory group 72 (71) to the data receiving device 4a, the virtual buffer memory group 72 (71) is released and managed as a free buffer memory group.

In the case of transmitting data of file B, C and D to the data receiving devices 4b to 4d as well as transmitting data of the file A to the data receiving device 4a in the operation, since buffer memories except the virtual buffer memory groups 71 and 72 are managed as free buffer memories, they are used as the virtual buffer memory groups for the files B, C, and D.

As should be appreciated from the foregoing description, in accordance with the embodiment 4, the data output device control circuit manages buffer memories as free buffer memories or virtual buffer memory groups, thereby free buffer memories except a virtual buffer memory group for a file may be used as a virtual buffer memory group for another file, in transmitting plural data to plural data receiving devices at the same time. Therefore, it is possible to reduce a total capacity of buffer memories if timings of data transfer of data receiving devices are varied from each other.

Embodiment 5

Figure 4:
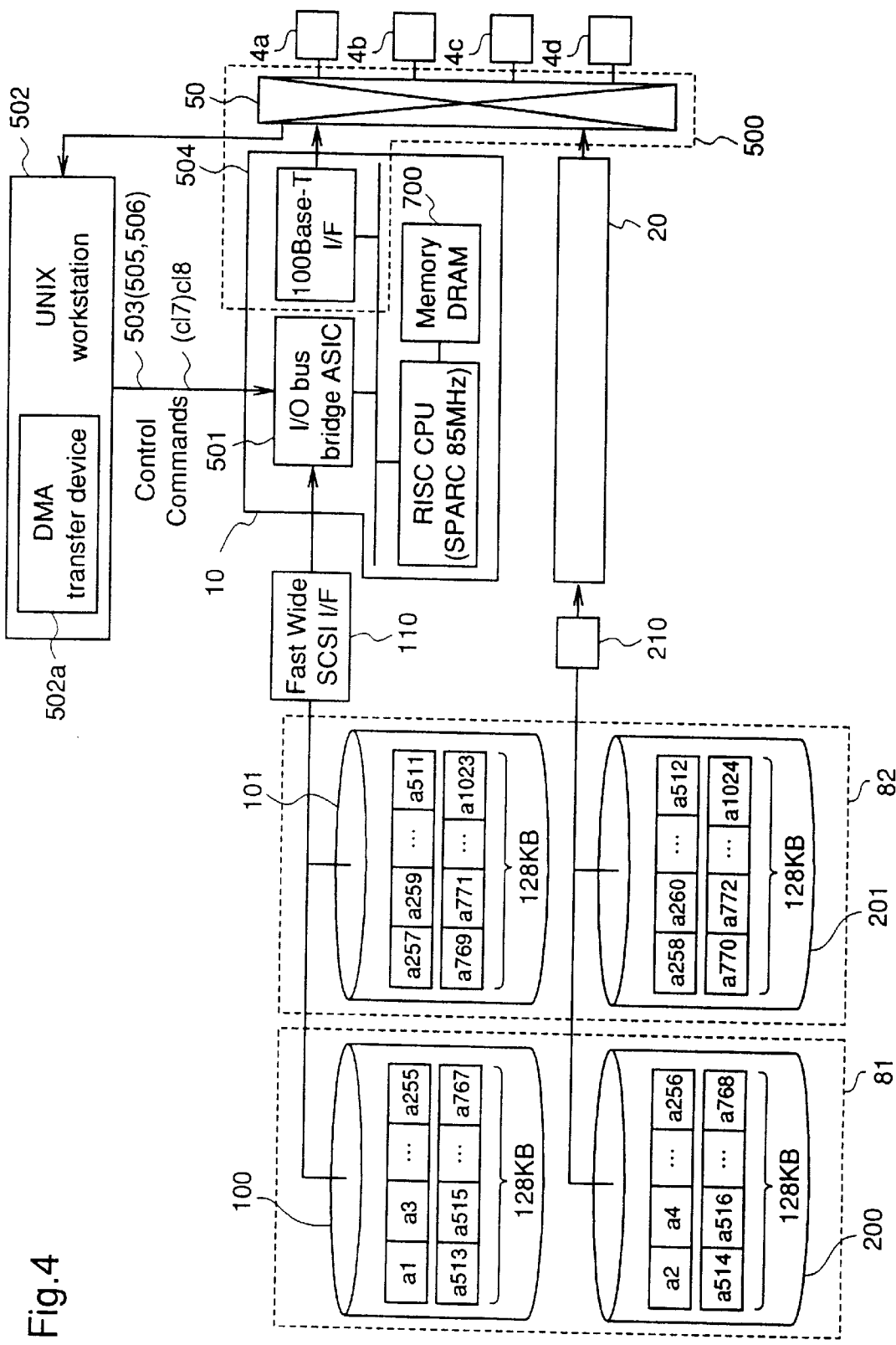
FIG. 4 is a block diagram illustrating a structure of a memory control device according to embodiments 5 to 9 and 12 of the present invention.
Figure 5:
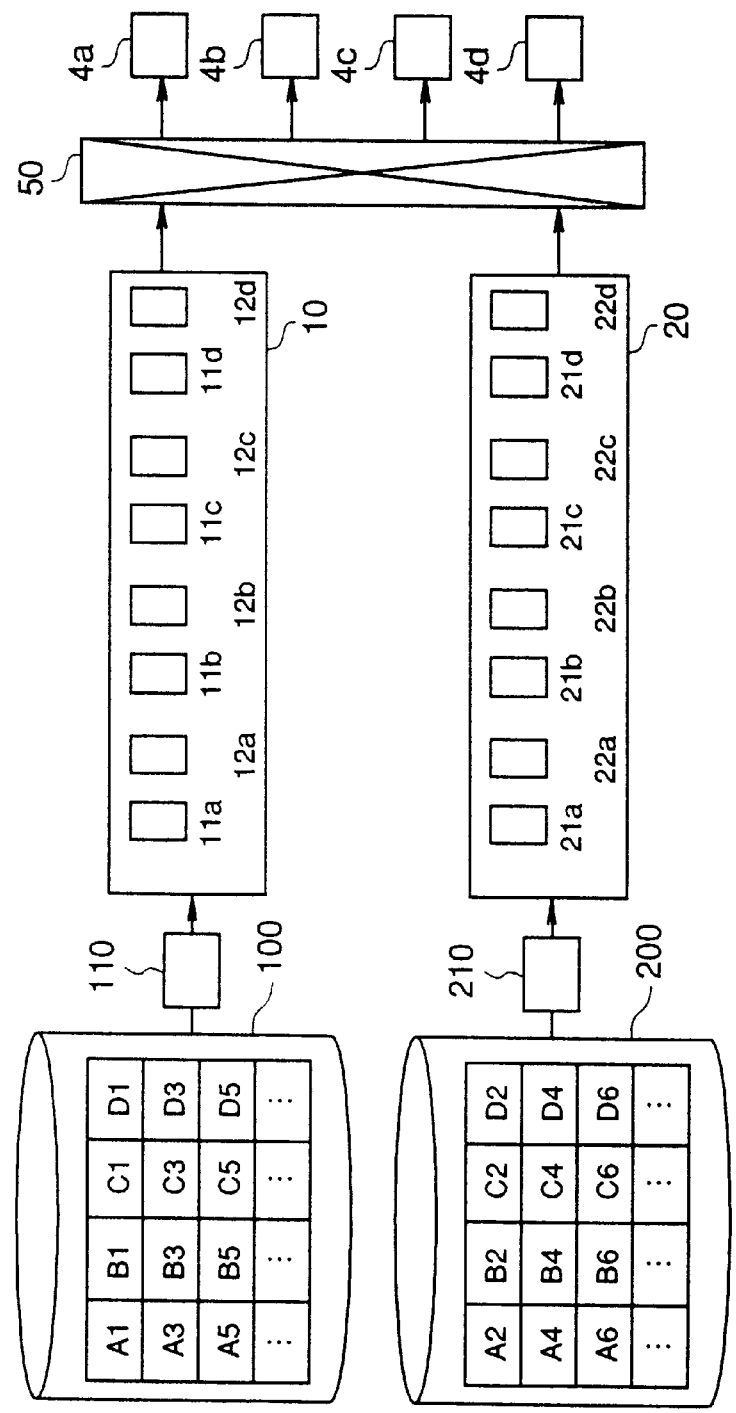
FIG. 5 is a block diagram illustrating a prior art memory control device.
Figure 6:
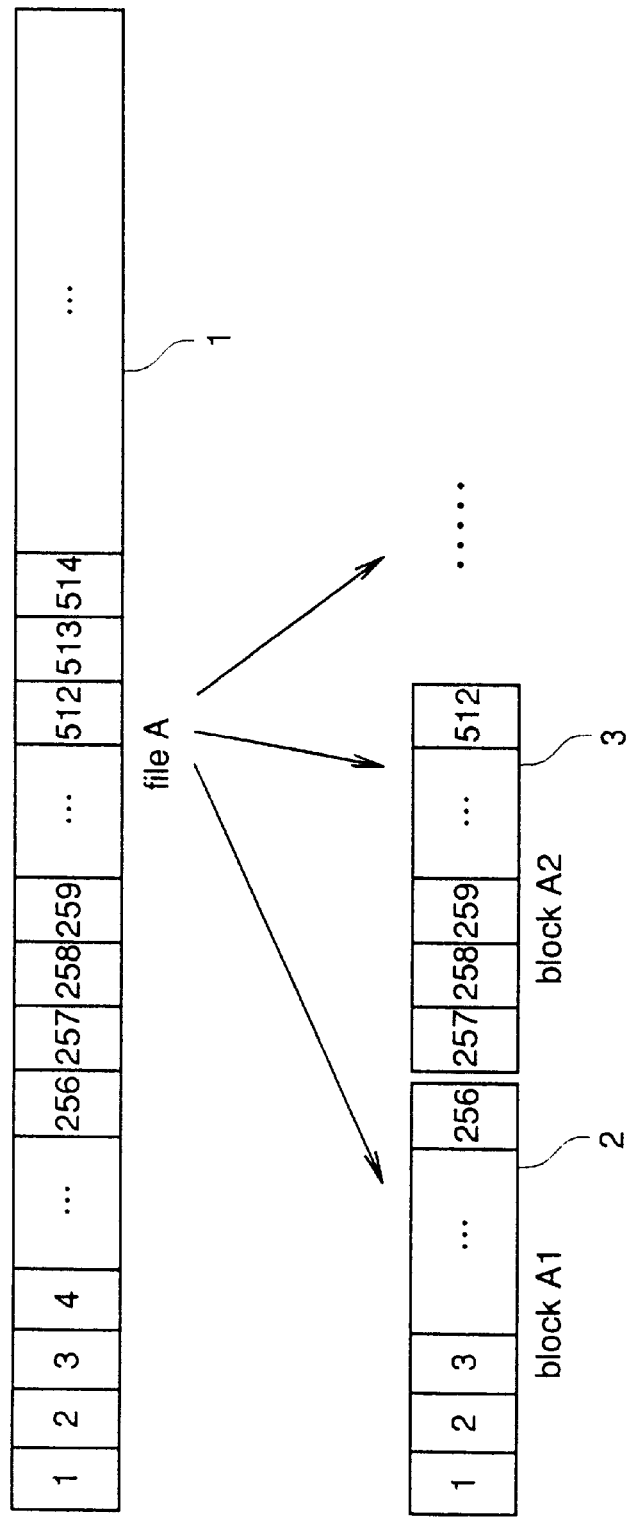
FIG. 6 is a diagram illustrating a structure of a file in a prior art memory control device.
Figure 7:
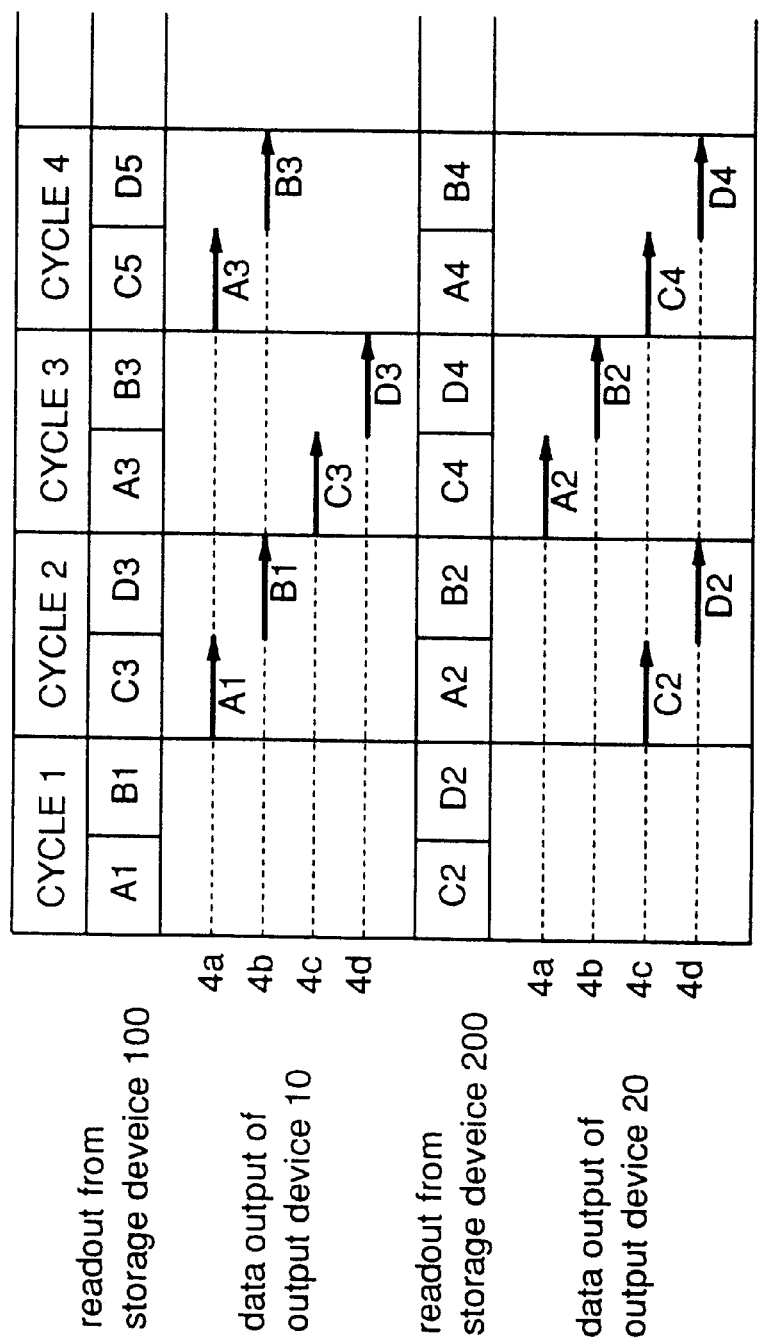
FIG. 7 is a diagram illustrating a relation between data read out from a storage device and data output to the data receiving device in each cycle in a prior art buffer memory control device.
Figure 8:
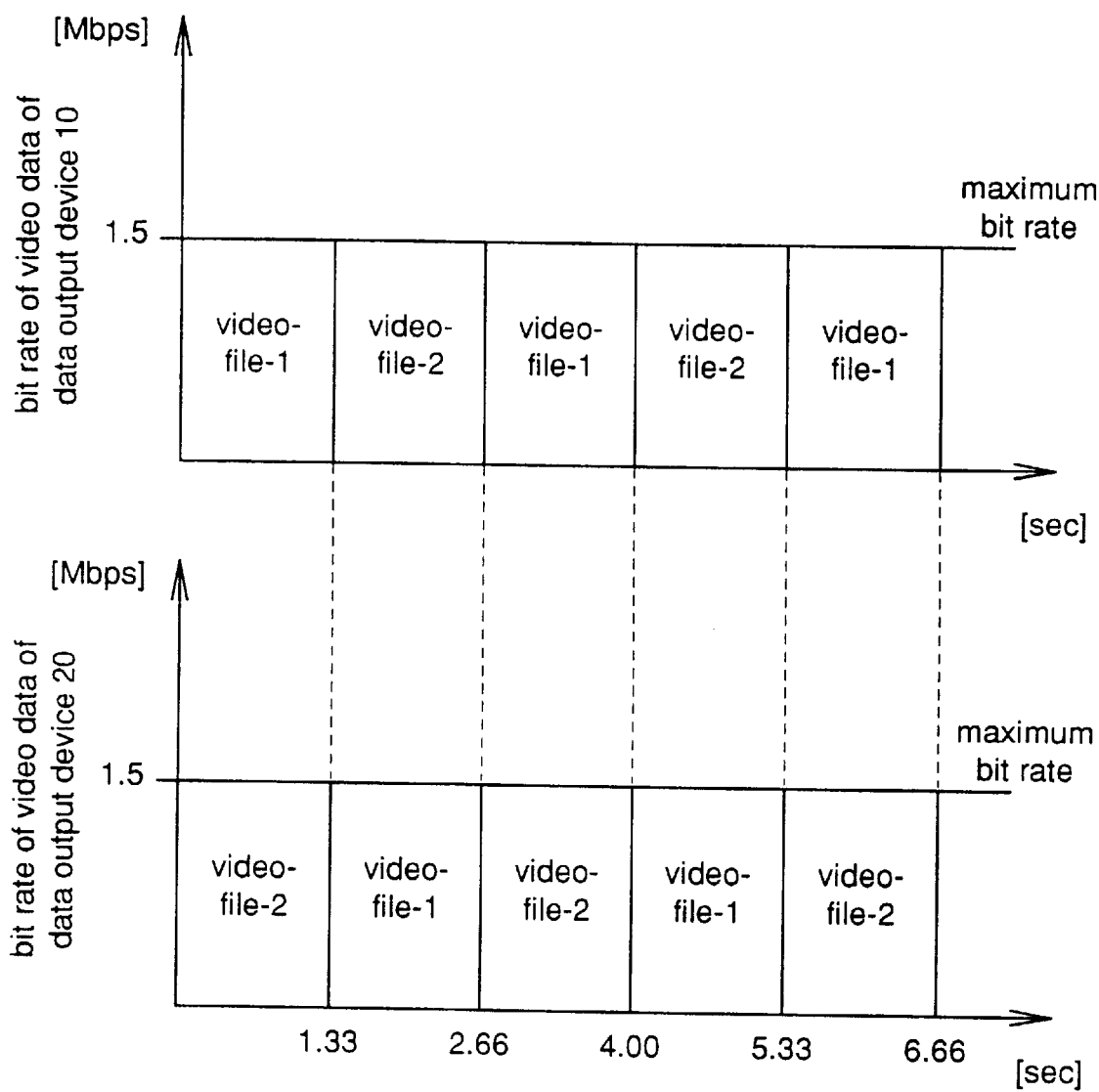
FIG. 8 is a diagram for explaining normal data transfer of a prior art memory control device.
Figure 9:
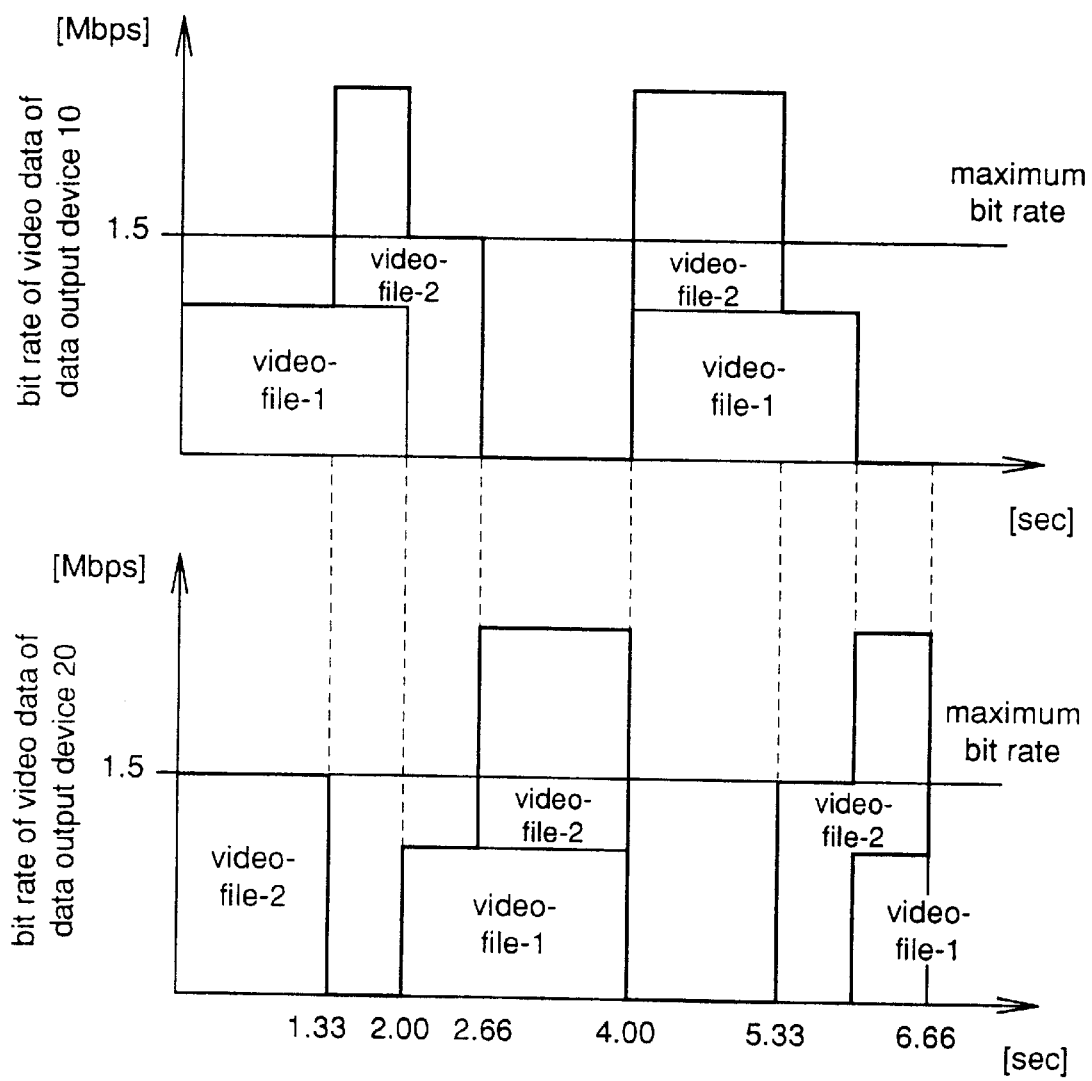
FIG. 9 is a diagram for explaining abnormal data transfer of a prior art memory control device.

A memory control device according to an embodiment 5 of the present invention is described. In the memory control device according to the embodiment 5, a network interface circuit 500 is connected to a buffer memory DRAM 700 as shown in FIG. 4. Through the network interface circuit 500, data temporarily stored in the buffer memory 700 is transmitted to a local area network (LAN) or a wide area network (WAN). The network herein represents a general term of a computer network. Standards of the network includes Ethernet (10Base-2/5/5), Fast Ethernet (100Base-TX/T4), Token-Ring, 100VG-AnyLAN, FDDI, or ATM.

In accordance with the memory control device according to the embodiment 5, the network interface circuit 500 is connected to the buffer memory 700. Therefore, an existing computer network line may be used for transmitting data. As a result, it is possible to transmit data to data receiving devices all over the world with ease.

Embodiment 6

A memory control device according to an embodiment 6 of the present invention is described. In the memory control device according to the embodiment 6, a bus interface circuit (I/O bus bridge ASIC) 501 is connected to the buffer memory 700 as shown in FIG. 4. Through the bus interface circuit 501, data temporarily stored in the buffer memory 700 is transmitted to an SBus, a PCI bus, or an EISA bus for general use which is standard on a work station or a personal computer.

The bus is plural data lines which are connected to 3 or more Ics or LSIs and through which data of the same bit width as a number of data lines is input/output. Generally, the bus is referred to as a data bus or a address bus depending on types of data to be transferred, or a system bus (CPU bus) or I/O bus (Input/Output bus) depending on an internal structure of a computer. The bus has several standards. NU bus of Macintosh Corp. in U.S. or SBus of Sun work station of Sun Microsystems Corp. in U.S. which is unique to a manufacturer, VME bus for use in a control system as a general-use bus, or XT (8 bit), AT (=ISA, 16 bit), EISA (32 bit), PCI (32 bit) for use in DOS/V PC is included in well-known I/O bus. These buses are each connected to a disc control circuit, a network control circuit or the like and often used for output/input of data from/into a computer.

In accordance with the memory control device according to the embodiment 6, the bus interface circuit 501 is connected to the buffer memory 700. Therefore, a rate at which data is transferred to a data receiving device including a bus interface circuit of a kind is by far higher (250 to 320 Mbit/sec) than that of a modem (28 Kbit/sec) or that of a network (100 to 150 Mbit/sec). This allows transmission of video of high quality.

Embodiment 7

A memory control device according to an embodiment 7 of the present invention is described. In the memory control device according to the embodiment 7, connections between a data output device control circuit (UNIX Workstation 502) and data output devices 10 and 20 are established by a network 503 such as LAN or WAN. The data output device control circuit UNIX Workstation 502 and the data output devices 10 and 20 are respectively provided with a network interface circuit 504 and a network protocol creation/analysis device (UNIX Workstation 502), between which connection is made by using a network cable 503. As a result, data transfer using a network protocol permits communication between the data output device control circuit and the data output devices.

Thus, in accordance with the memory control device according to the embodiment 7, connection is established between the data output device control circuit and the data output device by the network 503. Therefore, the data output device control circuit and the data output device can be provided spaced apart from each other, that is, they can be provided in different rooms or buildings.

Embodiment 8

A memory control device according to an embodiment 8 of the present invention is described. In the memory control device according to the embodiment 8, connections between the data output device control circuit UNIX Workstation 502 and the data output devices 10 and 20 are established by a bus 505 such as SBus, PCI bus or EISA bus. The data output device control circuit UNIX Workstation 502 and the data output devices 10 and 20 are respectively provided with a bus interface circuit 501, between which connection is established by a bus cable 505, thereby allowing communication between the data output device control circuit UNIX Workstation 502 and the data output devices 10 and 20 by the bus 505.

In accordance with the memory control device according to the embodiment 8, connection is made between the data output device control circuit UNIX workstation and the data output devices 10 and 20 by using the bus 500. Since a data transfer rate of the bus is twice or more as high as that of a serial connection or a network connection, it is possible to transmit more instructions from the data output device control circuit to the data output device in a given time and increase a number of data receiving devices.

Embodiment 9

A memory control device according to an embodiment 9 of the present invention is described. In the memory control device according to the embodiment 9, as shown in FIG. 4, connections between the data output device control circuit UNIX Workstation 502 and the data output devices 10 and 20 are established by a serial cable 506. The data output device control circuit UNIX Workstation 502 and the data output devices 10 and 20 are respectively provided with a serial interface circuit (IO/bridge ASIC), between which connection is made by a serial cable 506, thereby allowing communication between the data output device control circuit UNIX Workstation 502 and the data output devices 10 and 20 by using the serial cable 506.

As illustrated in the embodiment 7, when connections between the data output device control circuit UNIX Workstation 502 and the data output devices 10 and 20 are established by a network, since it is required that protocol header is added to each data to be transferred, protocol processing will be necessary later. The protocol header includes various types of information such as an ID number (a number which is sequentially added to each data to be transferred), a transfer destination address (information indicating a transfer destination of data), a transfer origin address (information indicating a transfer origin of data), and check sum (information with which correctness of data transfer is checked) and protocol header of approximately 100 byte is generally added to data of 1K byte. Therefore, transfer of 53 Mbps (53 Mbit per/sec) data requires approximately 40% usage of CPU for protocol processing in transferring data of 53 Mbps (53 Mbit per/sec) in a general work station (SPARCstation 5 in Sun Corp.). In the embodiment 9, serial cable 506 is employed to transfer data. As a result, protocol processing is unnecessary and usage of CPU can be reduced.

As should be appreciated from the foregoing description, in accordance with the memory control device according to the embodiment 9, connections between the data output device control circuit UNIX Workstation 502 and the data output device 10 and 20 are established by the serial cable 506. Therefore, it is possible to dispose the data output device control circuit and the data output devices, spaced apart from each other by about 10 meters. In addition, since protocol processing used in network connection is unnecessary, usage of the data output device control circuit is reduced. Accordingly, the usage of the data output device can be reduced. In addition, use of the serial cable 506 allows cheap system construction, compared with construction of a network.

Embodiment 10

A memory control device according to an embodiment 10 is described. The data output device control circuit constituting the memory control device according to the embodiment 10 performs synchronous control of plural data output devices 10 and 20 in a specified error range.

For example, in the case of establishing connections between the data output devices 10 and 20 and the data receiving devices 4a to 4d by using a network in the memory control device shown in FIG. 1, Ethernet is generally used as the network. In the Ethernet, data is divided into packets of a specified size (1.5 KB or smaller) for transferring data. When Connections between the data output devices 10 and 20 and the data receiving devices 4a to 4d are established by the Ethernet to transmit video according to MPEG 1 to the data receiving device 4a, it is necessary that data of 1.5 Mbit per/sec be transmitted, 192 packets are output from plural data output devices 10 and 20 to the data receiving devices 4a to 4d for the case of a packet of 1 KB. In case of outputting data alternately from the data output devices 10 and 20, the data output devices 10 and 20 each outputs 96 packets per/sec, that is, a packet every 10.4 ms, to the receiving device 4a. In order to realize continuous reproduction of video, it is necessary for the data receiving device to receive a packet output from the data output device 20(10) 5.2 ms after it receives a packet output from the data output device 10(20). If a packet arrives at the data receiving device 4a past 5.2 ms, continuous reproduction of video is not realized.

For this reason, synchronous control of plural data output devices 10 and 20 is performed in a range of 5.2 ms or smaller, thereby interval of arrival of a packet to the data receiving device 4a can be controlled. As a result, it is possible to realize continuous reproduction of data in the data receiving device 4a.

In the memory control device according to the embodiment 10, with changes of system construction such as motion picture compression format, a type of network, or number of data output devices, the error range of synchronous control of the data output devices varies.

First, assume that setting of the motion picture compression format changes. Since compression ratio of a video file varies for each format in the motion picture compression format, data transfer rate required for reproducing the same video that has been compressed changes. For example, data transfer rate in MPEG 1 is 1.2 to 1.5 Mbps and 4.0 to 6.0 Mbps in MPEG 2. Since data transfer amount for one second varies with change of data transfer rate, accordingly the error range of synchronous control of the data output devices 10 and 20 changes.

Next, assume that setting of the network changes. In a computer network according to the embodiment 10, combination of NFS, Ethernet and the like is assumed. Though a terminal performs request in 8 KB in the NFS (Ver 2.0), only packets of 1.5 KB or smaller are accepted in the Ethernet, so that response is performed with at least 6 (1.5 KB×5, 0.5 KB×1) divided packets.

Since a number of data output devices is assumed to be 2, 4, or 8, response is performed with (1 KB×8) packets to uniform a packet size. In case of NFS (Ver 3.0), a request of 32 KB or larger is possible, so that response is performed with (1 KB×64) packets. When the Ethernet is replaced by a higher-speed FDDI, 4.5 K.B is accepted as the largest size of a packet in the FDDI, response is performed with (2 KB×32, 4 KB×16) packets. Thus, since a number of packets to be transmitted per/sec changes depending on a size of a packet, accordingly error range of synchronous control of the data output devices changes.

Assume that a number of the data output devices 10 and 20 changes. For example, when a terminal performs request in 8 KB and a number of data output devices is 8, each data output device may respond to the request using a packet of 1 KB. In the case of 4, each data output device must respond to it using 2 packets of 1 KB. In this way, since a number of packets to be transmitted changes with a change of a number of the data output devices 10 and 20, accordingly the error range of synchronous control of the data output devices changes.

Thus, when system setting such as a motion picture compression format, a type of a network, or a number of the data output devices changes, accordingly the error range of synchronous control of the data output devices changes. It is preferable that setting is performed assuming the severe condition.

As should be appreciated from the forgoing description, in accordance with the memory control device according to the embodiment 10, synchronous control of plural data output devices is performed in a specified error range. Therefore, it is possible to control arrival interval of a packet to the data receiving device, resulting in continuous reproduction of data in the data receiving device with no discontinuity.

Embodiment 11

A memory control device according to an embodiment 11 of the present invention is described. In the data output device control circuit constituting the memory control device according to the embodiment 11, control instructions are integrated to be transmitted to the data output devices 10 and 20. It is required that time for integrating control instructions is not longer than an interval in which packets are output to the data receiving devices 4a to 4b, respectively. For example, in the embodiment 10, it is required that the time is not longer than 5.2 ms.

Thus, in accordance with the memory control device according to the embodiment 11, control instructions are integrated to be transmitted to the data output device. As a result, load on the data output device control circuit can be reduced.

Embodiment 12

A memory control device according to an embodiment 12 of the present invention is described. In a data output device control circuit constituting the memory control device according to the embodiment 12, control instructions are transmitted to the data output devices 10 and 20 by DMA (Direct Memory Access). As in the embodiment 7, in the case of establishing connections between the data output device control circuit (UNIX Workstation 502) and the data output devices 10 and 20 using SBus, since an operation circuit such as CPU is stored in the data output device control circuit, it is required that the data output device control circuit use the operation circuit to transmit transfer instructions 32 bit by 32 bit (data width of SBus) to the data output devices 10 and 20, causing large load on the operation of the data output device control circuit. In this embodiment 12, a DMA transfer control device 502A is provided in the data output device control circuit (UNIX Workstation 502), thereby an area of memory in which the operation device stores transfer instructions is posted to the DMA transfer control device and the transfer instructions are transmitted to the data output device through the DMA transfer control device 502A.

Thus, in accordance with the memory control device according to the embodiment 12, the control instructions are transmitted to the data output device by DMA. As a result, load on operation of the data output device control circuit can be reduced.

What is claimed is:

1. A memory control device having plural data transfer paths including a storage device group comprising plural storage devices for storing data and a buffer memory group comprising plural buffer memories for storing data transferred from the storage device group, said memory control device for dividing a file into plural blocks of a given size to store the blocks in plural separate storage devices on different data transfer paths, and for executing control to read data from the storage device to be output in accordance with a request from a terminal connected to the buffer memory wherein, storage devices on the different data transfer paths for creating plural virtual storage device groups, and buffer memories on the different data transfer paths for creating plural virtual buffer memory groups, said memory control device comprising, a data output control means for executing control so that in a first cycle, the data stored dividedly in a prescribed virtual storage device group of the plural virtual storage device groups is read to be temporarily stored in a prescribed virtual buffer memory group of the plural virtual buffer memory groups, and data stored in a virtual buffer memory group except the prescribed virtual buffer memory group is output, in a second cycle, data stored dividedly in a virtual storage device group except the prescribed virtual storage device group is read to be temporarily stored in a virtual buffer memory group except the prescribed virtual buffer memory group, and data stored in the prescribed virtual buffer memory group is output, and by alternately repeating the first and second cycles, data read from the plural virtual buffer memory groups is switched.

2. The memory control device as defined in claim 1 wherein said data output control means, manages the plural buffer memories as memories, creates another virtual buffer memory group using one or more free buffer memories of the plural free buffer memories, which do not constitute the virtual buffer memory, and among buffer memories constituting the plural virtual buffer memory groups, releases buffer memories in which output of data temporarily stored is completed from the plural virtual buffer memory groups to manage the released buffer memories as free buffer memories again.

3. The memory control device as defined in claim 2 wherein a network interface circuit is connected to the buffer memory and the data which is output from the data transfer path is output to a bus through the bus interface circuit.

4. The memory control device as defined in claim 3 wherein connection between the data output control means and the data transfer path is established by a network.

5. The memory control device as defined in claim 4 wherein the data output control means performs synchronous control of the plural data output devices in a specified error range.

6. The memory control device as defined in claim 4 wherein the data output control means issues a control instruction to the data transfer path every given time.

7. The memory control device as defined in claim 3 wherein connection between the data output control means and the data transfer path is established by a bus.

8. The memory control device as defined in claim 7 wherein the data output control means performs synchronous control of the plural data output devices in a specified error range.

9. The memory control device as defined in claim 7 wherein the data output control means issues a control instruction to the data transfer path every given time.

10. The memory control device as defined in claim 7 wherein the data output control means issues a control instruction to the data transfer path by DMA transfer.

11. The memory control device as defined in claim 3 wherein connection between the data output control means and the data transfer path is established by a serial line.

12. The memory control device as defined in claim 11 wherein the data output control means performs synchronous control of the plural data output devices in a specified error range.

13. The memory control device as defined in claim 11 wherein the data output control means issues a control instruction to the data transfer path every given time.

14. The memory control device as defined in claim 2 wherein a bus interface circuit is connected to the buffer memory and the data which is output from the data transfer path is output to a bus through the bus interface circuit.

15. The memory control device as defined in claim 14 wherein connection between the data output control means and the data transfer path is established by a network.

16. The memory control device as defined in claim 15 wherein the data output control means performs synchronous control of the plural data output devices in a specified error range.

17. The memory control device as defined in claim 15 wherein the data output control means issues a control instruction to the data transfer path every given time.

18. The memory control device as defined in claim 14 wherein connection between the data output control means and the data transfer path is established by a serial line.

19. The memory control device as defined in claim 18 wherein the data output control means performs synchronous control of the plural data output devices in a specified error range.

20. The memory control device as defined in claim 18 wherein the date output control means issues a control instruction to the data transfer path every given time.

21. The memory control device as defined in claim 2 wherein connection between the data output control means and the data transfer path is established by a network.

22. The memory control device as defined in claim 21 wherein the data output control means performs synchronous control of the plural data output devices in a specified error range.

23. The memory control device as defined in claim 21 wherein the data output control means issues a control instruction to the data transfer path every given time.

24. The memory control device as defined in claim 2 wherein connection between the data output control means and the data transfer path is established by a bus.

25. The memory control device as defined in claim 24 wherein the data output control means performs synchronous control of the plural data output devices in a specified error range.

26. The memory control device as defined in claim 24 wherein the data output control means issues a control instruction to the data transfer path every given time.

27. The memory control device as defined in claim 24 wherein the data output control means issues a control instruction to the data transfer path by DMA transfer.

28. The memory control device as defined in claim 2 wherein connection between the data output control means and the data transfer path is established by a serial line.

29. The memory control device as defined in claim 28 wherein the data output control means performs synchronous control of the plural data output devises in a specified error range.

30. The memory control device as defined in claim 28 wherein the data output control means issues a control instruction to the data transfer path every given time.

31. The memory control device as defined In claim 1 wherein a network interface circuit is connected to the buffer memory and the data which is output from the data transfer path is output to a network through the network interface circuit.

32. The memory control device as defined in claim 31 wherein connection between the data output control means and the data transfer path is established by a network.

33. The memory control device as defined in claim 32 wherein the data output control means performs synchronous control of the plural data output devices in a specified error range.

34. The memory control device as defined in claim 32 wherein the data output control means issues a control instruction to the data transfer path every given time.

35. The memory control device as defined in claim 31 wherein connection between the data output control means and the data transfer path is established by a bus.

36. The memory control device as defined in claim 35 wherein the data output control means performs synchronous control of the plural data output devices in a specified error range.

37. The memory control device as defined in claim 35 wherein the data output control means issues a control instruction to the data transfer-path every given time.

38. The memory control device as defined in claim 35 wherein the data output control means issues a control instruction to the data transfer path by DMA transfer.

39. The memory control device as defined in claim 31 wherein connection between the data output control means and the data transfer path is established by a serial line.

40. The memory control device as defined in claim 39 wherein the data output control means performs synchronous control of the plural data output devices in a specified error range.

41. The memory control device as defined in claim 39 wherein the data output control means issues a control instruction to the data transfer path every given time.

42. The memory control device as defined in claim 1 wherein a bus interface circuit is connected to the buffer memory and the data which is output from the date transfer path is output to a bus through the bus interface circuit.

43. The memory control device as defined in claim 42 wherein connection between the data output control means and the data transfer path is established by a network.

44. The memory control device as defined in claim 43 wherein the data output control means performs synchronous control of the plural data output devices in a specified error range.

45. The memory control device as defined in claim 43 wherein the data output control means issues a control instruction to the data transfer path every given time.

46. The memory control device as defined in claim 42 wherein connection between the data output control means and the data transfer path is established by a serial line.

47. The memory control device as defined in claim 46 wherein the data output control means performs synchronous control of the plural data output devices in a specified error range.

48. The memory control device as defined in claim 46 wherein the data output control means issues a control instruction to the data transfer path every given time.

49. The memory control device as defined in claim 1 wherein connection between the data output control means and the data transfer path is established by a network.

50. The memory control device as defined in claim 49 wherein the data output control means performs synchronous control of the plural data output devices in a specified error range.

51. The memory control device as defined in claim 49 wherein the data output control means issues a control instruction to the data transfer path every given time.

52. The memory control device as defined in claim 1 wherein connection between the data output control means and the data transfer path is established by a bus.

53. The memory control device as defined in claim 52 wherein the data output control means performs synchronous control of the plural data output devices in a specified error range.

54. The memory control device as defined in claim 52 wherein the data output control means issues a control instruction to the data transfer path every given time.

55. The memory control device as defined in claim 52 wherein the data output control means issues a control instruction to the data transfer path by DMA transfer.

56. The memory control device as defined in claim 1 wherein connection between the data output control means and the data transfer path is established by a serial line.

57. The memory control device as defined in claim 56 wherein the data output control means performs synchronous control of the plural data output devices in a specified error range.

58. The memory control device as defined in claim 56 wherein the data output control means issues a control instruction to the data transfer path every given time.

* * * * *